(12) United States Patent
Manes et al.

(10) Patent No.: US 9,295,943 B1
(45) Date of Patent: Mar. 29, 2016

(54) AIR TREATMENT SYSTEM AND METHOD

(71) Applicants: Scott Manes, Hulbert, OK (US); Randy Glad, Hulbert, OK (US)

(72) Inventors: Scott Manes, Hulbert, OK (US); Randy Glad, Hulbert, OK (US)

(73) Assignee: AMERICAN ENVIRONMENTAL FABRICATION & SUPPLY LLC, Hulbert, OK (US)

( * ) Notice: Subject to any disclaimer, the term of this patent is extended or adjusted under 35 U.S.C. 154(b) by 293 days.

(21) Appl. No.: 13/945,378

(22) Filed: Jul. 18, 2013

Related U.S. Application Data

(60) Provisional application No. 61/673,430, filed on Jul. 19, 2012.

(51) Int. Cl.
*A62B 7/08* (2006.01)
*B01D 53/85* (2006.01)

(52) U.S. Cl.
CPC ..................................... *B01D 53/85* (2013.01)

(58) Field of Classification Search
CPC ............................. B01D 53/1406; B01D 53/14
USPC .......................................................... 422/120
See application file for complete search history.

(56) References Cited

U.S. PATENT DOCUMENTS 6,471,918 B1 * 10/2002 Sherwood .......... B01D 46/0063
422/170

* cited by examiner

*Primary Examiner* — Kevin Joyner
(74) *Attorney, Agent, or Firm* — GableGotwals

(57) ABSTRACT

A filter system and method for capturing and treating HAPs and VOCs. The system has one or more dual pass filters. Each pass filter has a media bed with a plurality of VOC digesting microbes. Fluid from a holding tank containing additional microbes may be used to regenerate the media beds by transferring the fluid from the holding tank to the dual pass filter. Any one of the dual pass filters may be isolated from the flow of HAPs for regeneration of the media bed. Any one of the dual pass filters may also be isolated from fluid communication with the holding tank while in service in capturing HAPs and/or VOCs. The filter system being contained in a highly mobile enclosure.

12 Claims, 3 Drawing Sheets

AIR TREATMENT SYSTEM AND METHOD

1. CROSS-REFERENCE TO RELATED APPLICATIONS

The present application is a conversion and continuation-in-part of U.S. Provisional Patent Application No. 61/673,430 filed on Jul. 19, 2012 which is incorporated herein by reference.

2. FIELD OF THE INVENTION

The present invention relates to a system and method for capturing hazardous air pollutants (HAPs) and/or volatile organic compounds (VOCs), and then using naturally occurring micro-organisms to degrade those substances into non-hazardous by-products, such as carbon dioxide and water.

3. BACKGROUND OF THE INVENTION

Currently, various industries and manufacturing operations utilize processes that produce large volumes of volatile organic compounds (VOCs) and hazardous air pollutants (HAPs). These VOCs and HAPs typically end up as hazardous wastes that are released into the environment or stored in hazardous waste sites. Often, in order to comply with state and federal environmental regulations, some industries must either invest in the implementation of waste destroying/recycling equipment, pay for others to remove, destroy or recycle the hazardous wastes they produce, or pay considerable sums in fines or compensation fees for as long as they are releasing those VOCs and HAPs into the air.

Some industries, such as the painting industry, by the very nature of the products or services they provide, cannot simply eliminate these hazardous waste producing processes or even find effective substitutes for such processes. For example, manufacturers of steel pails use large quantities of solvents, lacquers and other finishing substances that are petroleum hydrocarbon-based. These substances are often applied to steel pails using spray booths, wherein the excess of those substances are vapors that are simply ventilated out to the atmosphere using exhaust blowers. As one of skill in the art may note, only a fraction of the finishing substances sprayed onto the steel pails in a spray booth area actually remain on the steel pails. Rather, a large percentage of those solvents are eliminated as waste products. Alternatively, the application of materials as sprays in spray booths or other similar operations may result in the release of large quantities of propellants, additives, by-products and other substances in vapor form into the atmosphere. As a consequence, in the context of this example, not only can an industry be forced to comply or compensate for state and federal requirements are great cost, but also that industry can be producing large volumes of hazardous waste products without any potential for recovery or recycling of those waste products.

Therefore, there exists a need in the industry for a system that will effectively recover and recycle hazardous materials released into the atmosphere in vapor form, such as solvents, varnishes, lacquers and other finishing substances that are petroleum hydrocarbon-based, in order to avoid the unnecessary waste of those materials and the unneeded expulsion of HAPs/VOCs into the atmosphere.

There exists a further need in the industry for a system that will cost effectively recover and recycle hazardous materials, and that will satisfy federal and state requirements for preventing the expulsion of HAPs/VOCs into the atmosphere.

4. BRIEF DESCRIPTION OF THE INVENTION

The present invention is a filter system and method for capturing and treating HAPs and VOCs. The system has one or more dual pass filters. Each pass filter has a media bed with a plurality of VOC digesting microbes. Fluid from a holding tank containing additional microbes may be used to regenerate the media beds by transferring the fluid from the holding tank to the dual pass filter. Any one of the dual pass filters may be isolated from the flow of HAPs for regeneration of microbes in the media bed or other maintenance. Any one of the dual pass filters may also be isolated from fluid communication with the holding tank while in service in capturing HAPs and/or VOCs. The filter system being contained in a highly mobile enclosure. Such enclosures might include but are not limited to a transmodal shipping container.

The present invention provides an effective system and method for removing HAPs and VOCs from air emissions. It provides a redundant system that allows for the dual filter to be taken off line while maintaining operations with the remaining dual filters. This allows for ease of maintenance and regeneration of microbe colonies.

The present invention provides highly mobile and modular filter system that can be manufactured in a factory and then easily shipped to a site for use.

5. BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

6. DETAILED DESCRIPTION OF THE PREFERRED EMBODIMENT(S)

Figure 1:
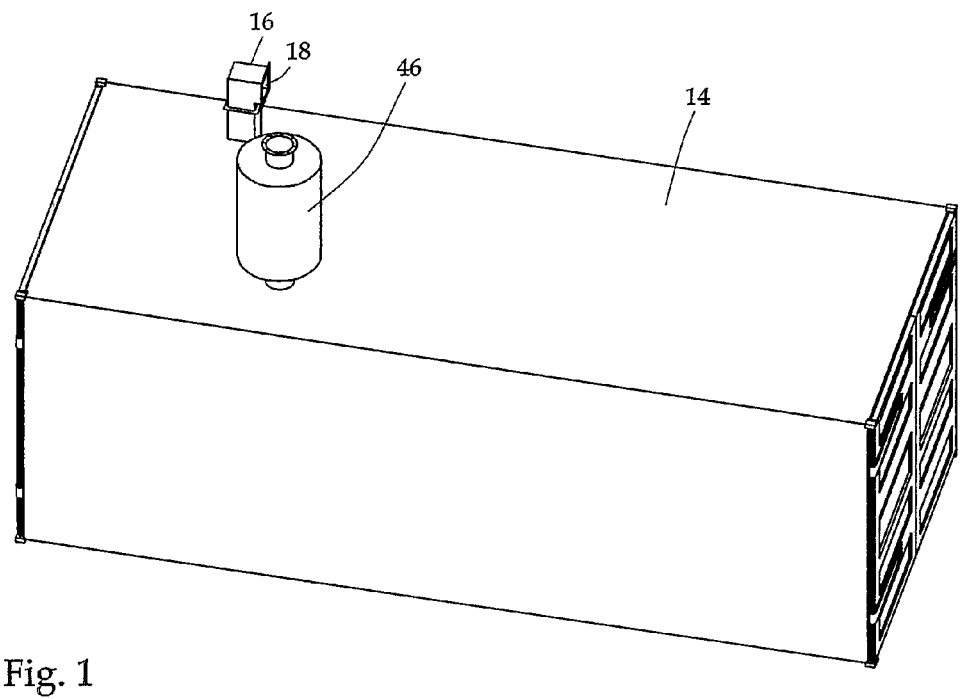
FIG. 1 is a perspective view of the present invention showing the exterior of the enclosure.
Figure 2:
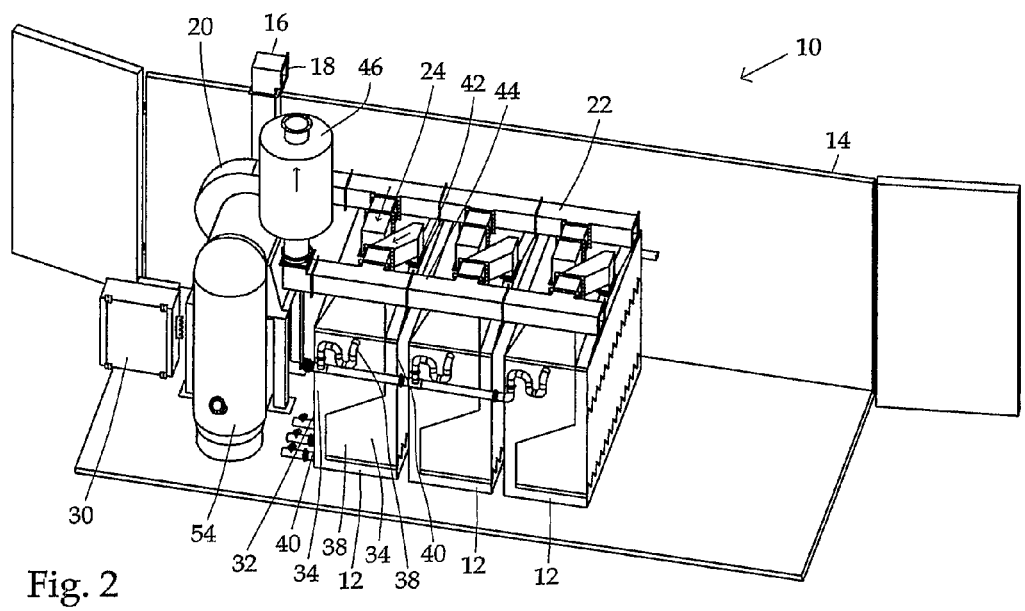
FIG. 2 is a perspective sectional view of the preferred embodiment of the present invention.
Figure 3:
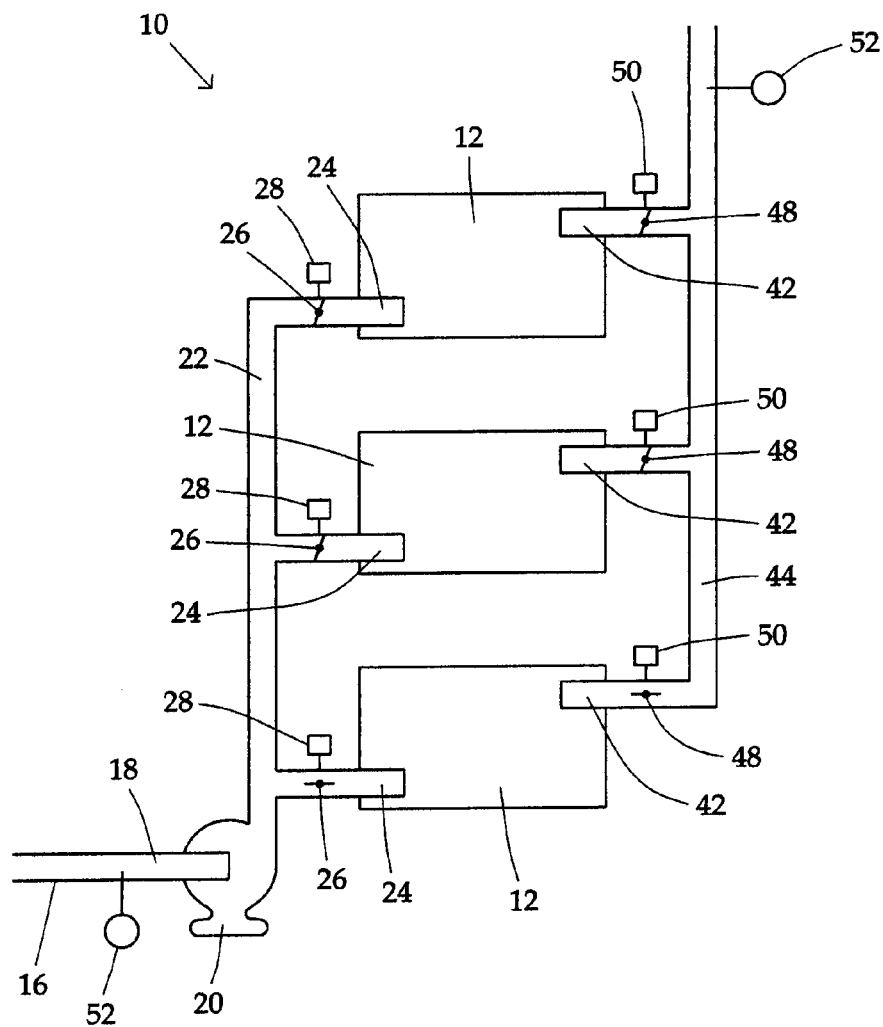
FIG. 3 is a diagram of the air flow of the preferred embodiment of the present invention.
Figure 5:
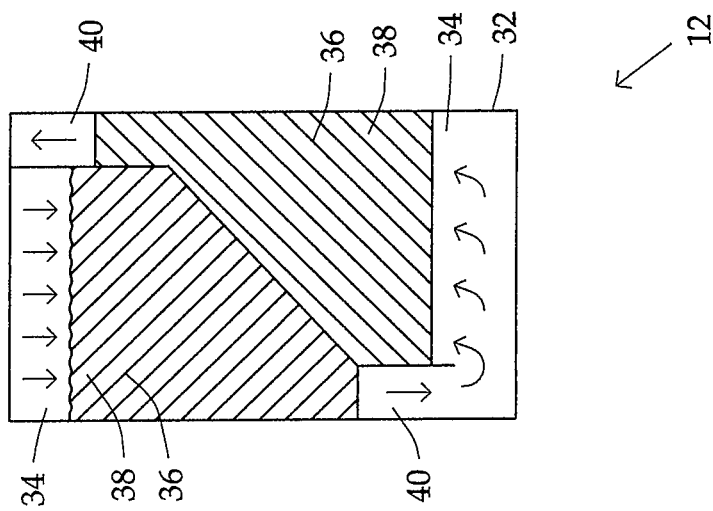
FIG. 5 is a cross-section of dual pass filter showing the media beds and internal components.
Figure 4:
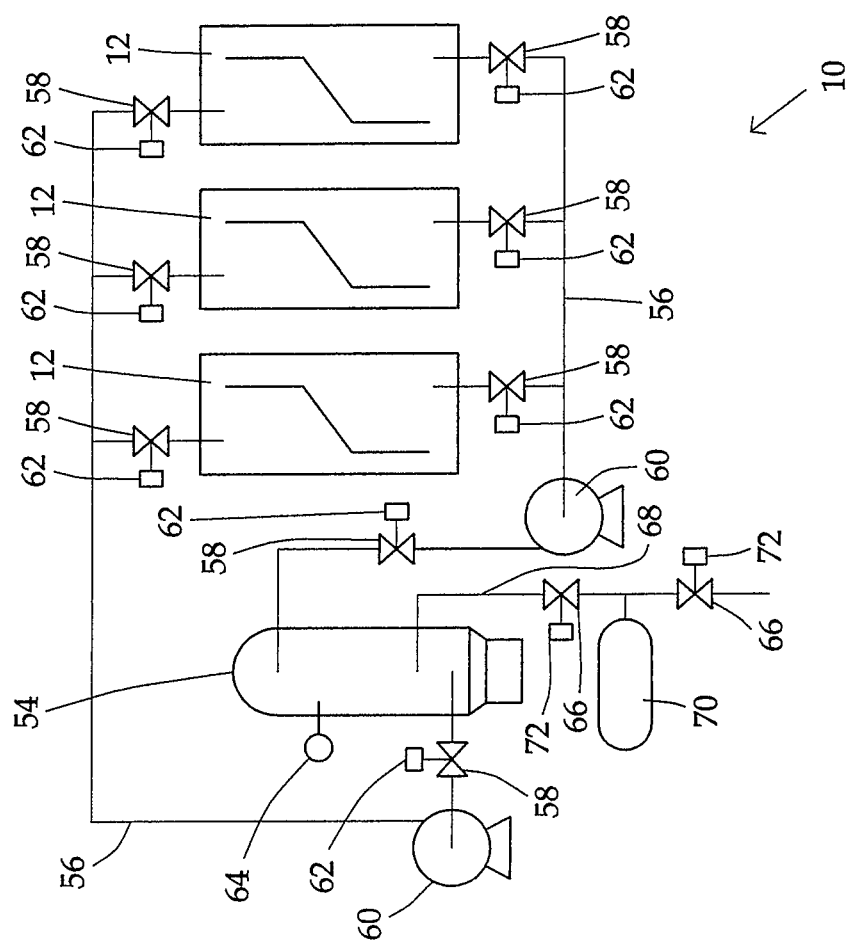
FIG. 4 is a diagram of the piping for carrying the microbe liquid.

Turning now to the drawings wherein like reference characters indicate like or similar parts throughout, FIG. 2 illustrates the preferred embodiment of the air treatment system 10 of the present invention. The system 10 has a plurality of dual pass filters 12 located in a portable enclosure 14. The polluted air to be treated is collected from the facility or industrial process generating it and delivered via duct work 16 to the air entry 18 of the system 10.

If necessary the system may be equipped with a pressure booster 20 such as the centrifugal fan shown in FIG. 2. This ensures the air has sufficient pressure difference to force it through the system 10. The air is then forced into the supply manifold 22 which is in fluid communication with the inlet 24 of the plurality of dual pass filters 12. Each dual pass filter inlet 24 has a damper 26 which can be open or closed. In the preferred embodiment the damper 26 is operated by a solenoid 28 which is controlled by a programmable logic controller 30 commonly referred to as a PLC.

Each dual pass filter 12 has an airtight and watertight shell 32 containing two chambers 34 each with media beds 36. The chambers 34 have a generally dogleg shaped profile and nest with one another within the confines of the shell 32. In the preferred embodiment the chambers 34 are oriented such that the air flows through the wider part 38 of the chamber and then the narrow portion 40 of the dogleg shape. The air is then directed to flow through the wider portion 38 of the complementary chamber 34 before it passes through the narrow portion 40 of complementary chamber 34 and into the dual pass filter 12 exit 42 and into the exit manifold 44. The exit manifold 44 is in fluid communication with the exits 42 of all of the dual pass filters 12 of the system 10 and an exhaust stack 46 through which the treated air may be released into the atmosphere or another system for further treatment or capture. In the preferred embodiment the inlet 24 and exit 42 are located at a level above the media beds 36.

In the preferred embodiment each of the dual pass filter exits 42 are equipped with a damper 48 which can be opened or closed. In the preferred embodiment the damper 48 is operated by a solenoid 50 controlled by the PLC 30.

The media beds 36 contain carbon or another substrate which carries microbes on its surface. The exact composition of the microbes may vary depending upon the composition of the air being treated. However in the preferred embodiment the microbes contain one or more of the following: actinobacteria, cyanobacteria, bacteroidates, deinococcus-thermus, thermotogae, firmictes, proteobacteria, zetaproteobacteria.

As a given dual pass filter 12 is operated its efficiency or ability to remove contaminants from the air declines. At some point it is necessary to close the inlet and exit dampers 26 and 48 on that dual pass filter 12 and open the inlet and outlet dampers 26 and 48 on a different dual pass filter 12. Thus the air is being treated by a different dual pass filter 12.

The timing of this change out of dual pass filters 12 may be determined by monitoring the level of pollutants in the air before and after the filter 12. This is accomplished with the use of probes 52. When the difference in these measurements hits a predetermined level, the change out of filter 52 occurs. In the preferred embodiment the analysis of the data from the probes 52 as well as the operation of the dampers 26 and 48 may be controlled by the PLC 30. During operation the flow of air to be treated is alternated among the plurality of dual pass filters 12 to provide time to regenerate the microbe population on the surfaces of the media bed 36.

With the first dual pass filter 12 offline, i.e. with the inlet and exit dampers 26 and 48 closed, the microbe population in the media bed 36 is replenished by pumping a liquid containing the microbes from a holding tank 54 to the dual pass filter 12. This liquid floods the chambers 34 and media beds 36. Thus allowing additional microbes to repopulate the surfaces of the media bed 36. Once the microbe population has been replenished to an acceptable level the liquid is moved from the chambers 34 and transferred back to the holding tank 54.

Movement of the liquid between the holding tank 54 and the dual pass filters 12 is accomplished through use of conduits 56 between these elements. The conduits 56 may be equipped with valves 58, pumps 60 and solenoid operators 62. In the preferred embodiment theses pumps 60 and solenoids 62 may be controlled by the PLC 30. Flow of the liquid may also be accomplished or aided by differences in elevation between the holding tank 54 and the dual pass filters 12.

In the preferred embodiment the system may be located in an enclosure 14. The enclosure 14 allows for control of temperature and other environmental elements which help maintain the microbe population. From time to time it may be necessary to replenish the microbe population in the liquid. This is accomplished by adding additional microbes to the liquid in the holding tank 54. The level of microbes in the liquid may be determined through use of a sensor 64 in contact with the liquid. The determination of the current microbe level as well as adding new microbes may be done manual or automatically by the PLC 30.

As the microbes metabolize the pollutants they produce water and other by-products. It may therefore be necessary to reduce the liquid level in the holding tank 54. The level of the liquid can be determined by a sensor 64 or sight glass located on the holding tank. The excess liquid can then be removed from holding tank 54 by opening a valve 66 on a drain line 68. The excess liquid is then either transferred to another tank 70 or directly disposed of. The removal of the excess liquid can be done either manually or by the PLC 30 monitoring the sensor 64 and operating a solenoid 72 to open and close the drain valve 66.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A filter system for removing pollutants from air, the system comprising:
    a fluid tight housing having a dual pass filter, the dual pass filter having two dogleg shaped passes nested with one another;
    a media bed contained in each of the passes;
    a VOC consuming microbes located on a surface of the media beds;
    an inlet located at a level above the media beds and being in fluid communication with a supply manifold and the passes;
    an exit located at a level above the media beds and being in fluid communication with an exit manifold and the passes;
    a damper located in the inlet capable of isolating the passes from the supply manifold; and
    a damper located in the exit capable of isolating the passes from the exit manifold.

2. The filter system according to claim 1, the microbes comprising one or more species selected from the group consisting of: actinobacteria, cyanobacteria, bacteroidates, deinococcus-thermus, thermotogae, firmictes, proteobacteria and zetaproteobacteria.

3. The filter system according to claim 2, further comprising:
    a plurality of dual pass filters with their inlets in fluid communication with the same supply manifold and their exits in fluid communication with the same exit manifold;
    a holding tank in communication with each of the dual pass filters via a pair of conduits wherein each dual pass filter is connected to the each of the conduits via a valve capable of isolating the dual pass filter from the holding tank.

4. The filter system according to claim 3, further comprising a fluid containing one or more species of a microbe selected from the group consisting of: actinobacteria, cyanobacteria, bacteroidates, deinococcus-thermus, thermotogae, firmictes, proteobacteria and zetaproteobacteria.

5. The filter system according to claim 4, further comprising a pump located on one of the conduits between the holding tank and the dual pass filters, wherein the pump is capable of moving the fluid from the holding tank to the dual pass filters.

6. The filter system according to claim 4, further comprising a pump located on one of the conduits between the holding tank and the dual pass filters, wherein the pump is capable of moving the fluid from the dual pass filters to the holding tank.

7. The filter system according to claim 6, further comprising a mobile enclosure containing the filter system.

8. The filter system according to claim 3, further comprising a drain line with a valve connecting the holding tank to a second tank.

9. The filter system according to claim 8, further comprising a solenoid operator on each valve and a programmable logic controller capable of operating the solenoid operators.

10. A filter system for removing pollutants from air, the system comprising:
- a plurality of fluid tight housing each having a dual pass filter, the dual pass filter having two dogleg shaped passes nested with one another;
- a media bed contained in each of the passes;
- a VOC consuming microbes located on a surface of the media beds, the microbes comprising one or more species selected from the group consisting of: actinobacteria, cyanobacteria, bacteroidates, deinococcus-thermus, thermotogae, firmictes, proteobacteria and zetaproteobacteria;
- each fluid tight housing having:
  - an inlet located at a level above the media beds and being in fluid communication with a supply manifold and the passes,
  - an exit located at a level above the media beds and being in fluid communication with an exit manifold and the passes,
  - a damper located in the inlet capable of isolating the passes from the supply manifold, and
  - a damper located in the exit capable of isolating the passes from the exit manifold;
- the inlets in fluid communication with the supply manifold and the exits in fluid communication with the exit manifold;
- a holding tank in communication with each of the dual pass filters via a pair of conduits wherein each dual pass filter is connected to the each of the conduits via a valve capable of isolating the dual pass filter from the holding tank;
- a drain line with a valve connecting the holding tank to a second tank; and
- a mobile enclosure containing the filter system.

11. The filter system according to claim 10, further comprising a pump located on one of the conduits between the holding tank and the dual pass filters, wherein the pump is capable of moving the fluid from the holding tank to the dual pass filters.

12. The filter system according to claim 10, further comprising a pump located on one of the conduits between the holding tank and the dual pass filters, wherein the pump is capable of moving the fluid from the dual pass filters to the holding tank.

* * * * *